No. 750,734. PATENTED JAN. 26, 1904.
P. H. THOMPSON.
ADDING MACHINE.
APPLICATION FILED JULY 18, 1903.
NO MODEL. 5 SHEETS—SHEET 1.
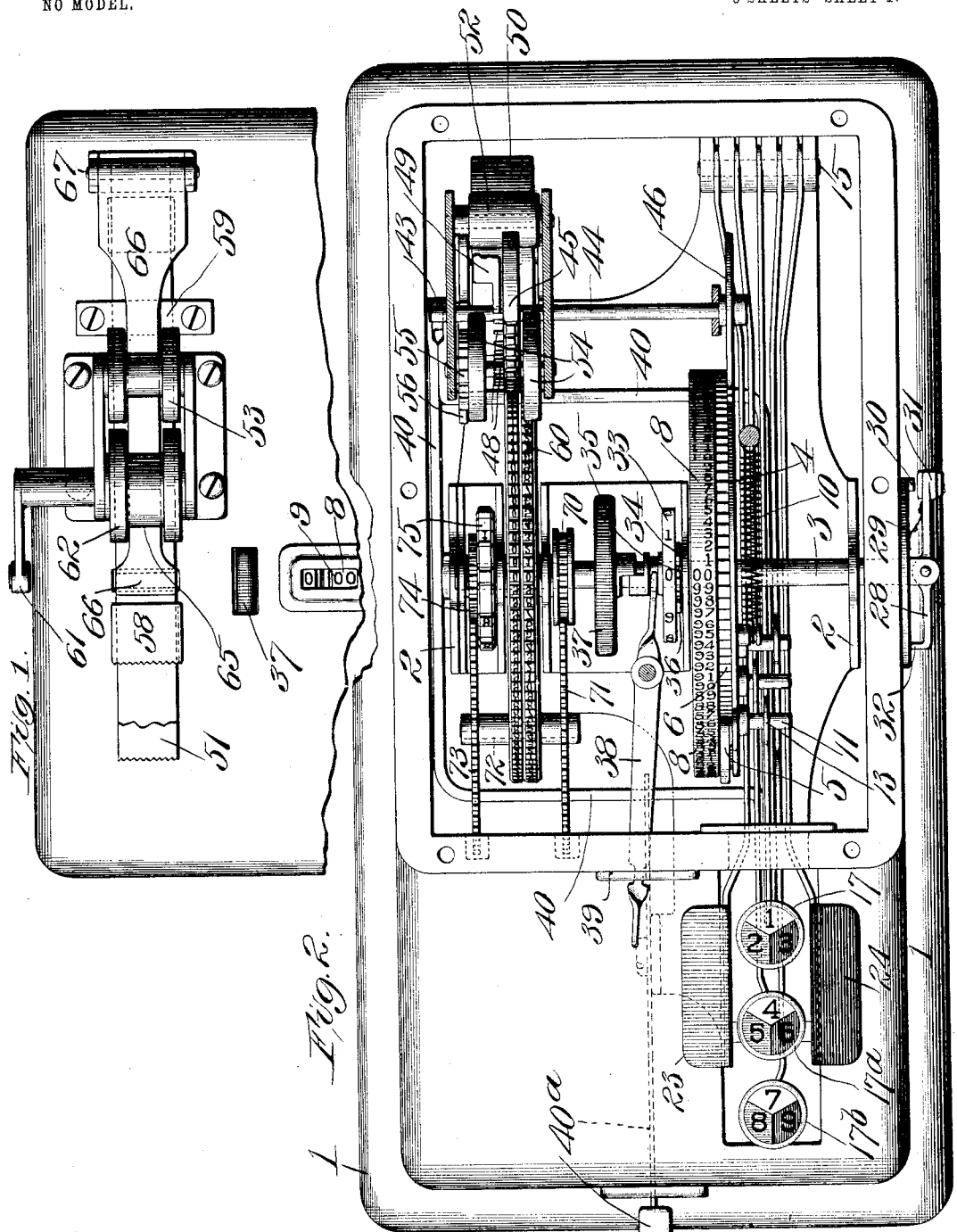
Witnesses:
Wm. J. Scott
F. H. Gibbs
Inventor:
Philip H. Thompson,
by Bakewell & Cornwall
attys.

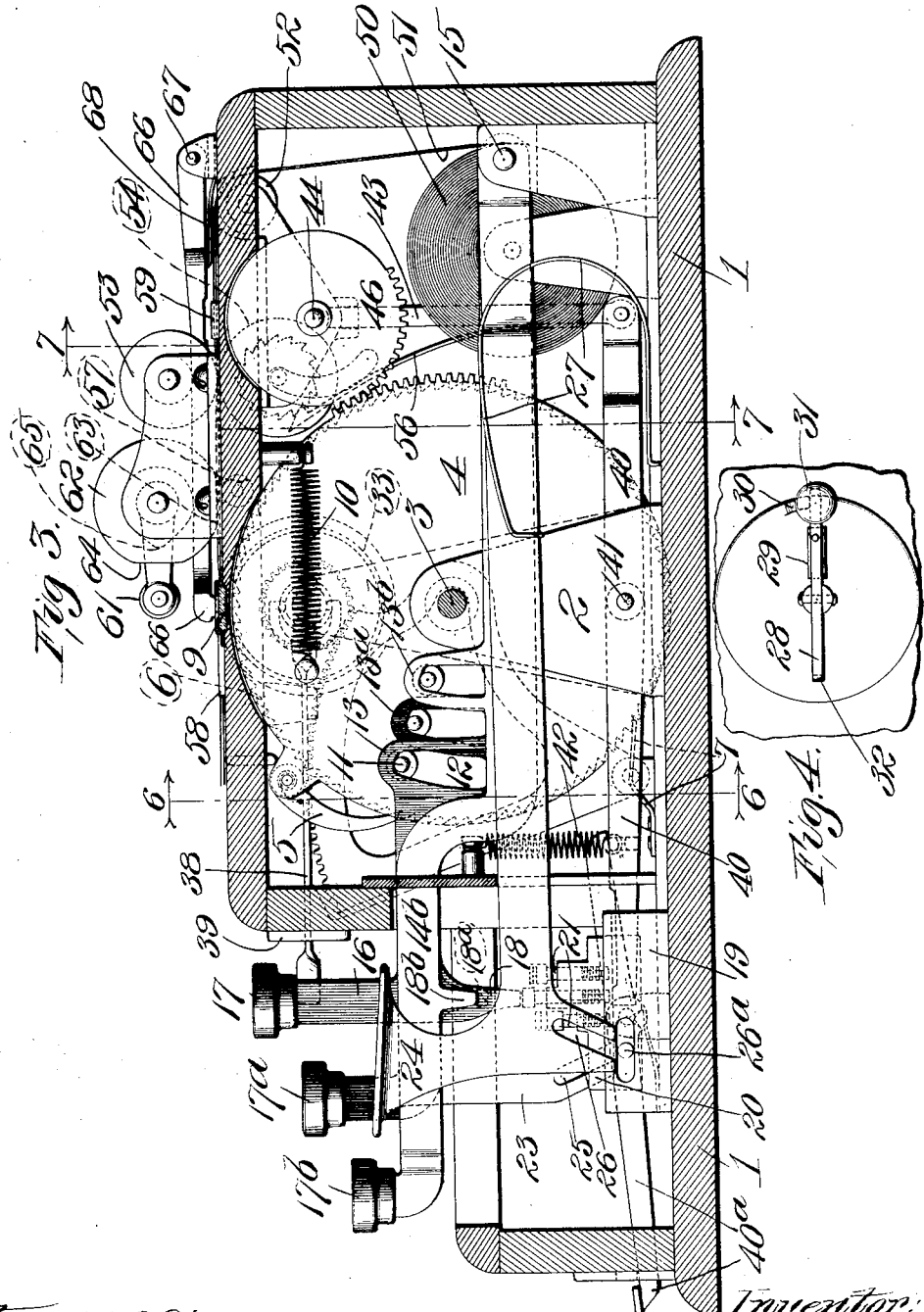

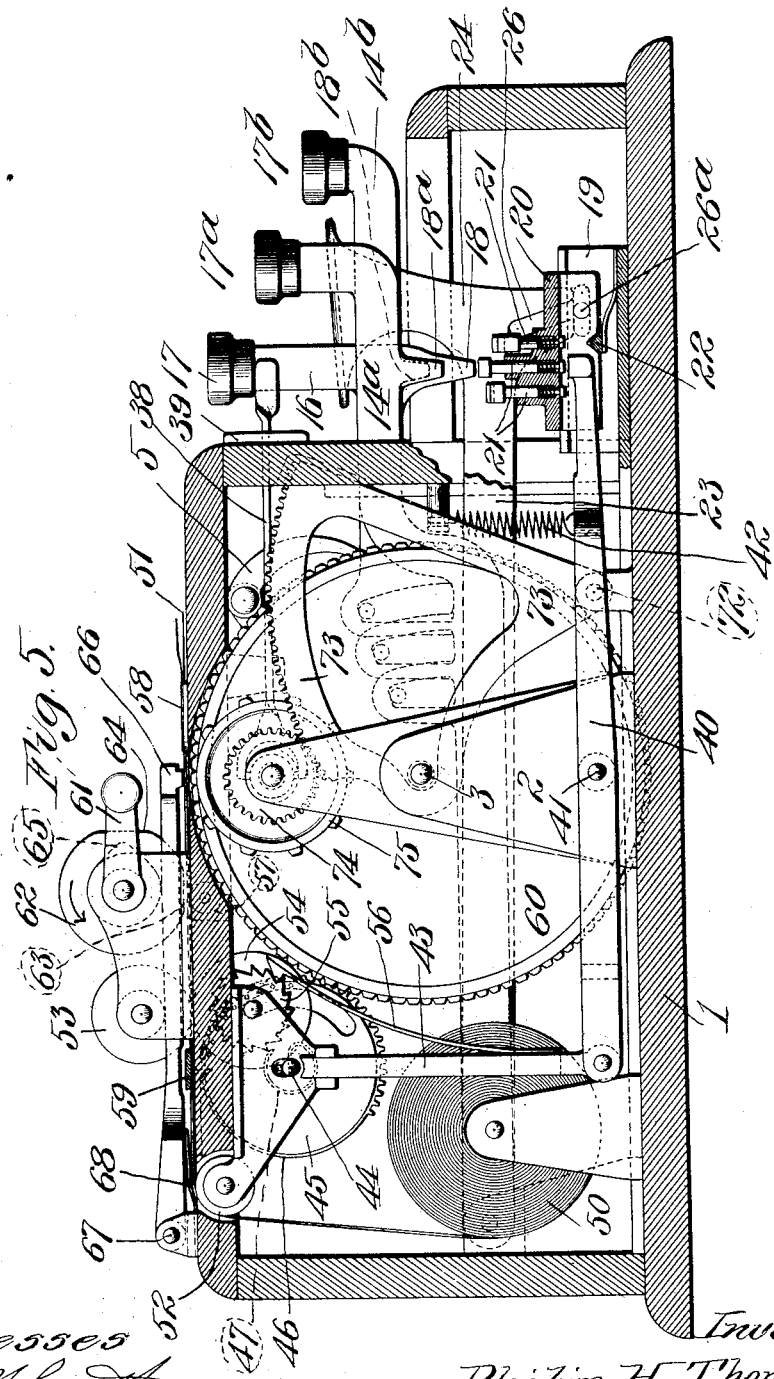

No. 750,734. PATENTED JAN. 26, 1904.
P. H. THOMPSON.
ADDING MACHINE.
APPLICATION FILED JULY 18, 1903.
NO MODEL. 5 SHEETS—SHEET 4.

Witnesses: Inventor:
Philip H. Thompson,
by Bakewell Cornwall
Attys.

No. 750,734. PATENTED JAN. 26, 1904.
P. H. THOMPSON.
ADDING MACHINE.
APPLICATION FILED JULY 18, 1903.
NO MODEL. 5 SHEETS—SHEET 5.
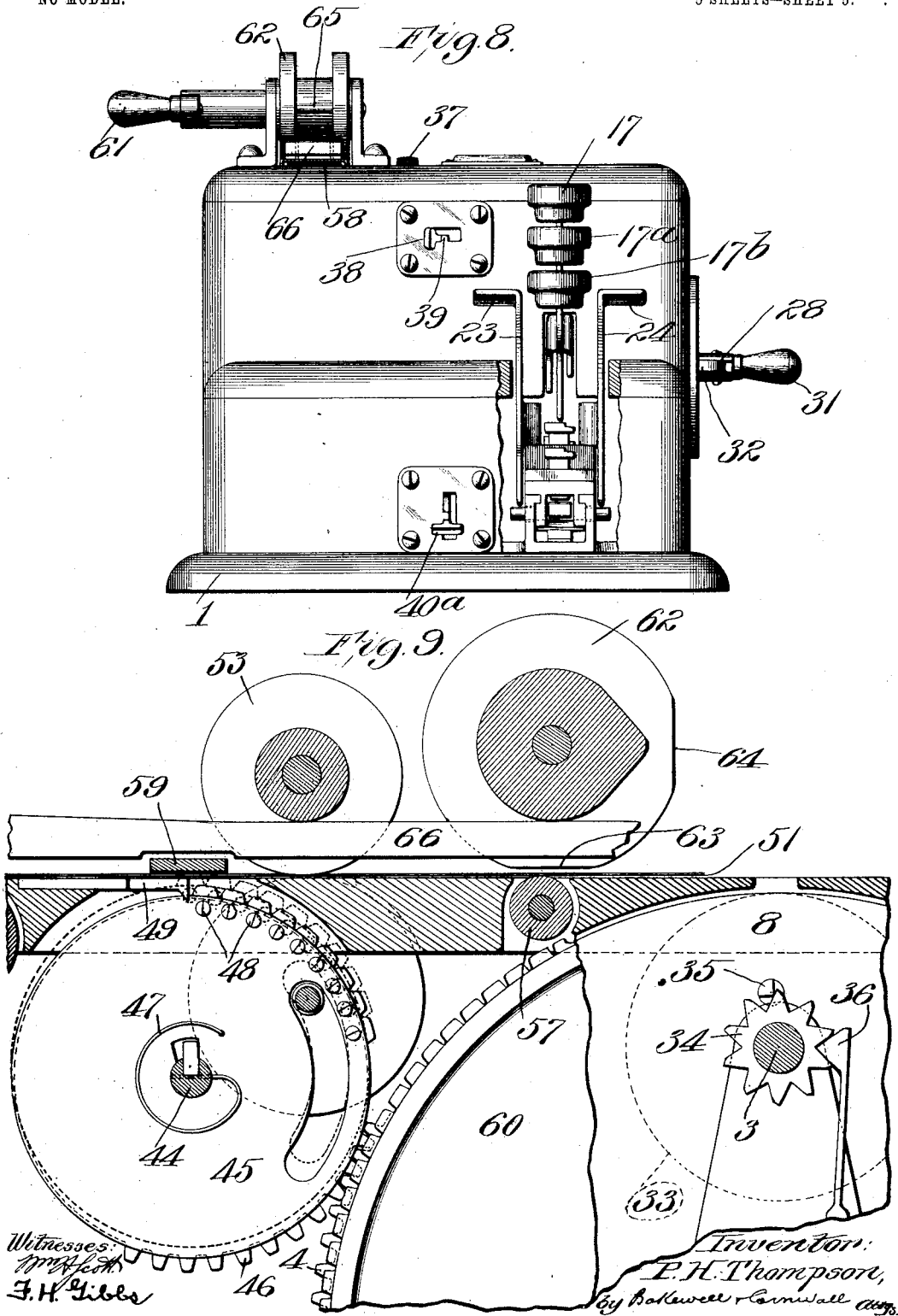

No. 750,734. Patented January 26, 1904.

UNITED STATES PATENT OFFICE.

PHILIP H. THOMPSON, OF ST. LOUIS, MISSOURI.

ADDING-MACHINE.

SPECIFICATION forming part of Letters Patent No. 750,734, dated January 26, 1904.

Application filed July 18, 1903. Serial No. 166,076. (No model.)

*To all whom it may concern:*

Be it known that I, PHILIP H. THOMPSON, a citizen of the United States, residing at St. Louis, Missouri, have invented a certain new and useful Improvement in Adding-Machines, of which the following is a full, clear, and exact description, such as will enable others skilled in the art to which it appertains to make and use the same, reference being had to the accompanying drawings, forming part of this specification, in which—

Figure 6:
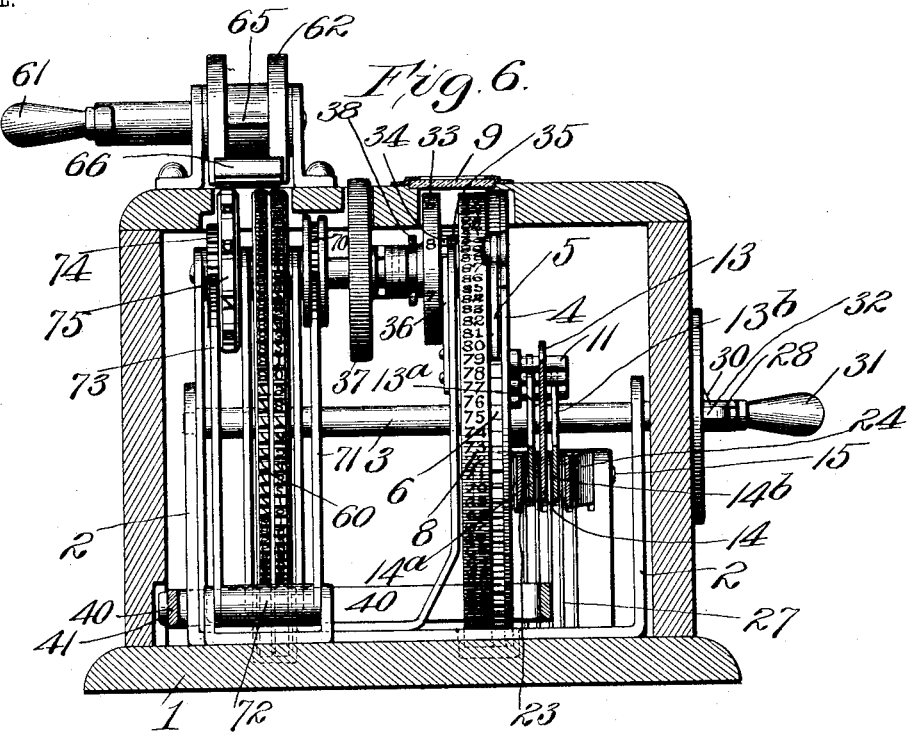
Figure 7:
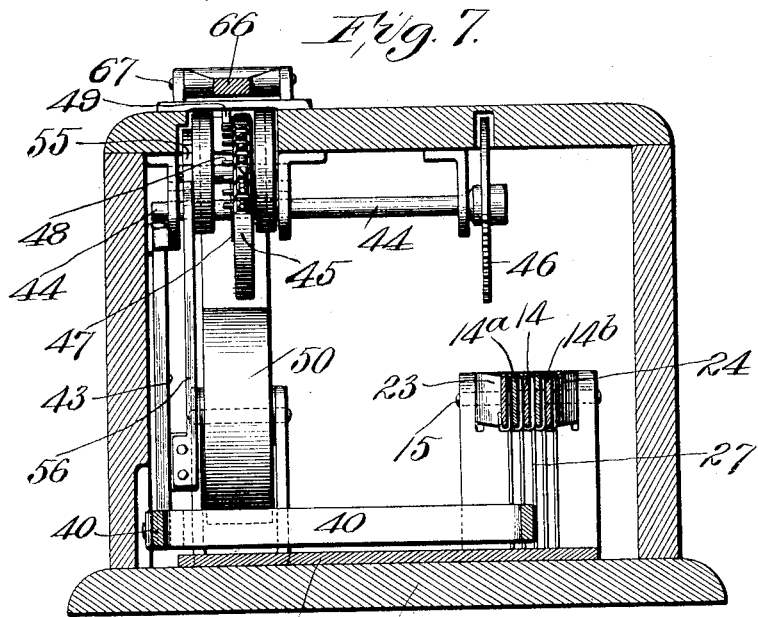

Figure 1 is a partial plan view illustrating the printing devices of my improved adding-machine. Fig. 2 is a plan view of the entire machine, the casing being removed to more clearly show the interior mechanism. Fig. 3 is a longitudinal vertical sectional view. Fig. 4 is a detail side elevational view of the restoring-handle. Fig. 5 is a longitudinal vertical sectional view, as seen from the opposite side of the machine. Fig. 6 is a cross-sectional view on line 6 6 of Fig. 3. Fig. 7 is a cross-sectional view on line 7 7 of Fig. 3. Fig. 8 is a front elevational view, part of the casing being broken away to show the interior; and Fig. 9 is an enlarged detail view illustrating the printing mechanism.

This invention relates to new and useful improvements in adding-machines, the object being to construct a machine of the character described wherein but a comparatively few number of keys are necessary to operate the device, these keys coöperating with shiftable controllers whereby their stroke is regulated. The type of machine shown in the accompanying drawings is one wherein the units-wheel alone is actuated, and therefore the keys are all identified with the units-column. From the units-wheel a tens-wheel, hundreds-wheel, &c., can be actuated in a manner well-known to those familiar with common forms of counting or registering mechanisms. While I have stated that the keys are identified with and drive the units-wheel, it is obvious that the mechanism shown in connection with the units-wheel could be duplicated, so that the tens or other wheels of higher denomination could likewise be primarily driven, the transfer mechanism of any well-known construction being employed between the units, tens, hundreds wheel, &c.

My invention consists in combining controlled devices with one or more driving or operating keys whereby when the controlled devices are operated the key or keys coöperating therewith will be arrested in one of a number of predetermined positions, whereby the wheel driven by the keys will be actuated proportionate to the movement of the key.

In addition to the key mechanism other details of improvement consist in the novel arrangement of the printing mechanism for recording the items and totals thereof, also in the novel construction and arrangement of the paper-feeding mechanism, finally in the construction, arrangement, and combination of the several parts, all as will hereinafter be described and afterward pointed out in the claims.

*The casing.*—In the drawings, 1 indicates a base upon which the supporting-brackets and casing are mounted, the casing being preferably a box-like structure consisting of side, end, and top walls provided with suitable openings, through which the different parts of the device may project to the exterior wherever desirable.

*The item-register.*—In order that the explanation of the machine may be simplified, I will state that in brackets 2 there is a transverse shaft 3, upon which is loosely mounted a disk 4, carrying the driving-pawl 5. This disk is in juxtaposition to the ratchet-wheel 6, fixed on the shaft 3, with the teeth of which pawl 5 coöperates. A detaining-pawl 7 also coöperates with the ratchet-wheel to prevent backward rotation thereof. The ratchet-wheel has conjoined thereto a numbered indicating and registering wheel 8, which is exposed through an opening in the top of the casing, preferably covered by a glass plate 9. (See Fig. 6.)

A spring 10 is connected at one end to a post extending from the top of the casing and at its other end to a stud on the disk 4, the energy of said spring being exerted at all times to restore the disk 4 to its normal or home position. In operation when the disk 4 is moved—say to the left from the position shown in Fig. 3—the pawl 5, being in engagement with the registering-wheel 8, will drive the latter from one to nine teeth, according to the key and controlling devices set in operation, and when the key is released the detaining-pawl 7 will hold the registering-wheel in its set position, and the spring 10 will return the pawl-carrying disk to its home position in readiness for another operation. In this way a succession of movements of varying degrees, depending upon the key-controlling devices operated, imparted to the pawl-carrying disk 4 will drive the registering-wheel, so that the total of the numbers registered in said wheel will be exhibited through the sight-opening in the machine. Means are also provided for printing these items and the total thereof; but I will not now refer to this feature of my invention, reserving the description thereof until later.

*The key-bars.*—Referring to Fig. 3, it will be seen that the disk 4 is provided with a stud 11, bearing against the top wall of a slot 12 in a projection 13, said projection being integral with a key-bar 14, pivoted at 15 in a suitable bracket at the rear end of the machine. The forward end of this key-bar terminates in a shank 16, having a head 17, preferably having three varicolored spaces, each space being numbered "1," "2," "3."

18 indicates a downwardly-extending projection on the forward end of the key-bar for coöperating with one of a series of stops or control devices designed to be placed in the path thereof, so that whenever the key-bar 14 is depressed the disk 4 will be rotated the distance of one, two, or three teeth, depending upon the controlling-stop in the path of the projection 18.

I will here state that the registering-wheel has one hundred ratchet-teeth and indicating-numbers corresponding therewith. It is obvious, however, that fewer or greater number of teeth and numbers can be employed; but any change in the number of teeth will necessitate a corresponding change in the stroke of the keys. I will assume, however, for purposes of this description that the registering-wheel has one hundred teeth and corresponding numerals in its periphery and that when the parts are in the position shown in Fig. 5 a depression of the key-bar 14 will cause the pawl-carrying disk to drive the registering-wheel one one-hundredth part of a revolution or the distance of one ratchet-tooth.

19 indicates a block forming a guideway in which is slidably mounted a shiftable controlling device 20, carrying a number of yielding stop-pins corresponding to the different distances any key of the series may be moved to drive the registering-wheel to different positions. In the particular machine under consideration there are three stop-pins (marked 21) coöperating with suitable springs to hold them in elevated position. The heads of these three stop-pins lie in different horizontal planes, and when any key is depressed it will first come in contact with the stop-pin in its path and depress said stop-pin until the pin is brought to a position of rest, which determines the lowermost position of the key being operated. The purpose of interposing yielding pins between the key and the shiftable controlling device is to obtain movement from the key to effect the printing of the several items being registered, as will hereinafter be described.

The normal position of the shiftable block 20 is shown in Fig. 5, wherein the middle stop-pin is in the path of movement of all of the keys, and assuming that key-bar 14 is depressed it is obvious that the finger 18 will immediately engage the middle stop-pin in its path and force the same downwardly until it is arrested, the arrested position determining the amount of movement of the key-bar 14, which is sufficient to drive the registering-wheel the distance of one tooth. If it is desired to drive the registering-wheel the distance of two teeth, the shiftable device is moved outwardly, so as to present the innermost or second stop-pin under the finger 18. When key-bar 14 is now depressed, it follows that it will move through an arc of a circle having an initial free motion sufficient to drive the registering-wheel the distance of one tooth before it comes in contact with the stop-pin in its path, its continued movement in engagement with the stop-pin driving the registering-wheel the distance of another tooth, making the full driving motion of the key-bar equivalent to two teeth. If the shiftable device is now moved inwardly, so as to present the outermost or third stop-pin in the path of the projection 18, it follows that the depression of key-bar 14 will be to a greater extent, and on account of this greater movement the registering-wheel is driven the distance of three teeth. For purposes of distinction I will refer to these stop-pins as the "first stop-pin," meaning the one normally under the finger 18 and which permits the smallest amount of motion being imparted to the registering-wheel upon the depression of any key; the "second stop-pin," referring to the innermost or next highest, which permits a greater amount of motion being imparted to the registering-wheel upon the depression of any key, and the "third stop-pin," the one on the lowest plane, which permits the greatest amount of motion being imparted to the registering-wheel upon the depression of any key.

The shiftable block 20 is normally held in its central position, or in a position where the first stop-pin is under the projections on the key-bars, by means of a spring-tooth 22, fitting in a V-shaped opening in the bottom face of the block. (See Fig. 5.) I will now describe the means whereby this shiftable block 20 may be moved to its three different positions.

*The shifting devices.*—23 and 24 indicate shifting-keys preferably pivoted on the shaft 15, said keys being elongated and located at the sides of the main operating or driving keys. Each of the shifting-keys is provided with inclined slots 25 and 26, which are open at their bottoms, the open ends of the slots being located above a pin $26^a$, whose ends pass through slots in the guiding-block 19. The slots 25 and 26 are oppositely inclined, and when either shifting-key is depressed the block 20 is shifted so as to place the second or third stop-pin in the path of the fingers on the key-bars. By depressing the shifting-key 23 the second stop-pin will be placed under the projections on the key-bars, and by depressing the shifting-key 24 the third stop-pin will be placed in the paths of the projections on the key-bars. It is intended that but one shifting-key be operated at a time and in conjunction with any one of the main keys. The main keys and the shifting-keys are each held in their normal or elevated positions by means of springs 27. (See Figs. 3 and 7.)

*Operation of the keys and shifting devices.*—From the above description it will be obvious that if the key-bar 14 is depressed and the shiftable block 20 is in its normal position the registering-wheel will be moved the distance of one tooth, that if the shifting-key 23 is operated to put the second stop-pin under the projection 18 when the key-bar 14 reaches the extremity of its downward movement the registering-wheel will have been moved the distance of two teeth, and that when the shifting-key 24 is operated to place the third stop-pin under the projection 18 the key-bar 14 will have a greater movement and upon its arrest by the third stop-pin will have moved the registering mechanism the distance of three teeth.

In order that the operator may be able to readily determine which shifting-key to operate to obtain the desired results, each key is preferably divided into fields, and each field has a background of color different from the others. For instance, in the particular machine under consideration there are three keys, each bearing three numerals. The numerals "1," "4," and "7" on the white divisions indicate that the depression of any key individually without resorting to the shifting-keys will move the registering-wheel the distance of one, four, or seven teeth, depending upon the key operated. The numerals "2," "5," and "8" appear on colored divisions—say, for instance, light blue—and indicate that if the shifting-key 23, whose upper face is similarly colored, is first operated and any one of the main keys subsequently operated the registering-wheel will be driven the distance of two, five, or eight teeth, depending upon the key operated. The numbers appearing on the dark red or brown divisions indicate that if the shifting-key 24, whose face is correspondingly colored, is first operated and one of the three keys subsequently operated the registering-wheel will be driven the distance of three, six, or nine teeth, depending upon the key operated.

In order to accomplish the above and to save excessive movement of the key-bars, I locate the disk-pins, which are controlled by keys bearing the higher numbers, nearer the axis of the pawl-carrying disk 4. For instance the pin $13^a$ is identified with the key-bar $14^a$, which carries the head $17^a$ and projection $18^a$, while the pin $13^b$, nearest the axis of rotation of the disk 4, is identified with the key $14^b$, which carries the head $17^b$ and the projection $18^b$. The parts are so proportioned that when the keys are depressed independently of the shifting-keys key-bar 14 will drive the registering-wheel one tooth, key-bar $14^a$ will drive the registering-wheel four teeth, and key-bar $14^b$ will drive the registering-wheel seven teeth, the projections 18, $18^a$, and $18^b$ of these teeth, respectively, all coöperating with the first stop-pin. When the shifting-key 23 is operated to present the second stop-pin in the paths of the projections 18, $18^a$, and $18^b$, key-bar 14 will drive the registering-wheel two teeth, $14^a$ will drive the registering-wheel five teeth, and $14^b$ will drive the registering-wheel eight teeth, and when the shifting-key 24 is operated to present the third stop-pin under the projections 18, $18^a$, and $18^b$ key-bar 14 will drive the registering-wheel three teeth, $14^a$ will drive the registering-wheel six teeth, and $14^b$ will drive the registering-wheel nine teeth.

*Restoring the registering-wheel.*—In order to restore the registering-wheel to zero position, the shaft 3 extends through the casing, as shown in Figs. 2 and 4, and carries a pivoted lever 28 on its end. A spring 29 holds one end of this lever out from contact with a lug 30. In setting the registering-wheel to zero the handle 31 is caught by the operator and the end of the lever to which it is connected pressed inwardly. The operator then uses the handle as a crank to rotate the registering-wheel in a forward direction or toward the left until the handle is arrested by contact with the lug 30, which determines the zero position of the registering-disk. The opposite end of lever 28 is provided with a projection 32, whose function is to prevent the spring from throwing the handle end of the lever out too far.

*The hundreds-indicator.*—The capacity of the registering-disk shown is one hundred, and in order that the scope of the machine may exceed this number I arrange in juxtaposition to said registering-disk a small indicating-disk 33, (see Figs. 2, 6, and 9,) which indicator-disk has a star-wheel 34, conjoined thereto, with which star-wheel coöperates a pin 35 on the indicator-disk, whereby upon every complete revolution of the registering-wheel 8 the disk 33 will be moved one-tenth of a revolution. A detaining-pawl 36 tends to hold the disk 33 in any position in which it may be set. A milled wheel 37 is arranged on the shaft of the disk 33 and projects through an opening in the top of the casing, whereby the indicating-disk 33 may be manually returned to zero.

*Rendering the hundreds-indicator inoperative.*—It frequently happens in adding up a column of figures that the total of any one denomination will not exceed one hundred, and to avoid resetting the disk 33 every time the registering-wheel 8 is restored to normal position, which restoration means that the wheel 8 will have made a complete revolution and ordinarily will have operated the disk 33, I provide means whereby the star-wheel 34 may be moved out of the path of the pin 35. This means consists of a lever 38, having a forked end engaging a reduced annulus in the hub of the disk 33, whereby said disk and its hub may be slid longitudinally the shaft. The lever 38 projects outwardly through the casing and may be set to either side of a tooth in a keeper-plate 39. To avoid feathering the disk 33 on its shaft, I interlock the hubs of said disk and of the milled restoring-wheel whereby the disk 33 may be moved longitudinally the shaft, but is not capable of independent rotation.

*Printing the items.*—To print the items registered in the wheel 8 and disk 33, I make each of the stop-pins an operating medium for the item-printing devices. Irrespective of the stop-pin in the paths of the fingers 18, 18ª, and 18ᵇ and irrespective of the key operated the final stroke of the key moves a stop-pin and depresses the head on the lower end thereof into engagement with the forward end of a frame 40, rocking said frame on its pivotal bearing 41, so as to elevate the rear end thereof. The forward end of the frame is normally held up by means of a spring 42. (See Fig. 5.) The rear end of the printing-frame carries a link 43, which is held by guiding-lugs under one end of a shaft 44, which shaft carries a type-wheel 45. (See Fig. 9.) The opposite end of this shaft is held against vertical movement, and consequently when the link 43 lifts the free end of the shaft and its carried printing-wheel a type impression will be made.

To render the printing mechanism inoperative, a lever 40ª engages the forward end of the printing-frame 40, so as to depress the same and hold it out of operative engagement with the stop-pins 21. This lever 40ª passes through a keeper-plate on the front wall of the machine, which keeper-plate is provided with a tooth to hold the forward end of the lever in its elevated or depressed position. When the lever is depressed, as shown in Fig. 3, the printing-frame is operative; but when said lever is elevated, as shown in Fig. 8, the printing-frame is depressed and rendered inoperative.

Referring now to Fig. 3, it will be observed that the disk 4 is provided with a series of teeth meshing with the teeth on a disk 46, fixed upon the vertically-immovable end of shaft 44. The movement of disk 4 controls the distance of movement of the registering-wheel 8, and consequently through the meshed disk 46 the printing-disk will be correspondingly controlled and printing-type characters from one to nine, inclusive, will be positioned under the platen before the free end of shaft 44 is moved vertically to carry the type-wheel up to make the printing impression.

It is obvious that as the final driving movement of the key is utilized in operating the printing mechanism some provision must be made to hold the type-wheel against rotation during the time that it is making a printing impression, so as to avoid blurring the figures. To accomplish this, I mount the type-wheel 45 on the shaft 44 in such manner that the type-wheel will be arrested without interfering with the slight further rotation of the shaft 44, a spring 47 being employed to restore the parts to normal position after the printing impression.

The type-wheel is also provided with a series of laterally-projecting pins 48 near its periphery, with which a stop-finger 49 coöperates. The parts just above described operate as follows: If "1" is being registered in the wheel 8, the projection 18 will in the act of registering "1" almost immediately start to depress the first stop-pin, and consequently the printing-wheel will be rotating and moving vertically simultaneously, so that its ultimate direction of movement is in a curved line from the position shown in full lines in Fig. 9 to the position shown in dotted lines in said figure. The first portion of this movement is free; but when the first pin 48 contacts with the stop-finger 49 the wheel is arrested against further rotation and is only capable of moving vertically to make the printed impression. All of the pins 48 are preferably flattened at the left side in order to offer a shoulder of some considerable area for engagement with the stop-finger 49.

If a greater number than "1"—such, for instance, as "9"—is being introduced into the registering-wheel, it follows that the first portion of the movement of the key-bar will be during a period that its projection 18, 18ª, or 18ᵇ is out of contact with the stop-pin. Consequently the printing-wheel is merely rotated without being lifted. As the final movement of the key-bar causes its projection to contact with the stop-pin, the stop-pin lifts the printing-wheel, and such lifting occurs only after some of the teeth 48 have passed the stop-finger. The proper tooth will now be brought up to engage the stop-finger, and continued rotation of the shaft 44, amounting to about the distance of one-half a printing character, will be absorbed by the spring 47, while the printing-frame will continue its vertical movement to make a printing impression, impressing the character on a strip of paper.

*The paper-feed.*—The paper upon which the printing impressions are made is wound in spool form and supported within the casing of the machine, the spool being indicated at 50 in Fig. 3. I do not show inking-ribbons coöperating with the printing-type, as I contemplate using a carbon strip wound up with the spool of paper, so that when the type makes a printing impression the carbon-sheet will leave a legible impression upon the strip of paper. I have shown the carbon strip as 51. The paper and its carbon strip after leaving the spool pass over a roller 52 and then between an idle roller 53, mounted above the top plate, and the feed-roller 54, mounted below the top plate. This feed-roller 54 is preferably divided, as shown in Fig. 7, a portion being located on each side of the printing-wheel, and is conjoined to a ratchet 55, with which coöperates a pawl 56, so that on the downstroke of the printing-frame or the movement restoring the printing-frame to normal position the paper will be fed. The paper after passing the feed-roller passes over an idle roller 57 and then through a serrated guideway 58. The platen is indicated at 59.

*Printing the total.*—In order to print the total, the shaft 3, before referred to, has fixed thereto a total-printing wheel 60, containing type characters from "1" to "100," inclusive. Assuming that the various items have been registered and printed on the strip of paper and it is desired to print the total or footing thereof, the following devices are set into operation: A handle 61 is grasped by the operator and given one complete rotation in the direction of the arrow shown in Fig. 5. This handle is arranged on a shaft, which shaft carries two disks 62, having flat faces 63 and 64. Between the disks is a cam projection 65, and under this cam projection is a movable platen 66, pivoted at its rear end at 67 and held in an elevated position by a spring 68. In its normal position the flat face 63 is out of contact with the roller 57; but when the handle 61 is moved in the direction indicated the flat portions of the disks are displaced and the peripheries of the disks contact with the roller 57 and forcibly draw the paper forward, so as to locate the recently-printed items in advance of or above the total, and when the flat faces 64 appear opposite the roller 57 the cam 65 depresses the platen 66 and makes a printing impression of the total, after which the peripheries of the disks again engage the roller 57 and move the paper strip forwardly a short distance.

The one-hundreds-indicating disk 33, before referred to, has its counterpart in the total-printing devices, and motion is imparted from the disk 33 to its counterpart printing-disk in the following manner: 70 indicates a gear on the shaft of disk 33, which gear meshes with a segment 71. This segment is fixed to a rock-shaft 72, said rock-shaft having also fixed thereto another segment 73, which meshes with a gear 74, conjoined to the one-hundreds-printing type-wheel 75. (See Fig. 5.) Thus when the indicating-disk 33 is in coöperative relation to the registering-wheel 8 the type-wheel 75 will be operated at each operation of the disk 33, and when the disk 33 is restored to zero position the disk 75 will likewise be restored to zero position. The registering-wheels 8 and 60 are fixed to the shaft 3, and both are driven and restored simultaneously.

From the above it will be seen that the adding-machine shown in the accompanying drawings is extremely simple in construction, is cheap in cost of production, and containing, as it does, a fewer number of keys than ordinarily found in machines of this type it is readily and quickly operated, and after familiarizing himself with the keyboard the operator can manipulate the same without looking at it. The printing devices are simple and not liable to get out of order, and while I have described carbon-paper as carrying coloring-pigment to be impressed upon the paper it is obvious that other forms of inking devices could be employed. Furthermore, while I have limited the capacity of my machine to "999" it is obvious that additional indicating and printing wheels can be employed, making the capacity such as desired. In fact, in the type of machine shown where the units-wheel alone is driven the operating mechanism does not have to be multiplied or duplicated to increase the capacity of the machine, it being only necessary to add the thousands, ten-thousands, and hundred-thousands wheels, and so on, the capacity of the machine being practically unlimited. However, while I do not wish to be limited so far as the capacity of the machine goes it is obvious that a machine operated as herein described need possess but a small capacity, as its greatest field of usefulness will be found in the addition of single columns of figures—such, for instance, as the column of units, the column of tens, &c.

I am aware that minor changes in the construction, arrangement, and combination of the several parts of my device can be made and substituted for those herein shown and described without in the least departing from the nature and principle of my invention.

Having thus described my invention, what I claim as new, and desire to secure by Letters Patent, is—

1. In an adding-machine, the combination with a registering-wheel, of a vibratory pawl-carrying disk for driving the same, said disk being provided with teeth, a printing mechanism in mesh with the teeth on said disk, a plurality of pins extending laterally from said disk at different distances from its axis of rotation, and a plurality of key-bars having slotted projections coöperating with said pins; substantially as described.

2. In an adding-machine, the combination with a registering-wheel, of a vibratory pawl-carrying disk for driving the same, said disk being provided with teeth, a printing mechanism in mesh with the teeth on said disk, and key-bars connected to said disk at varying distances from its axis of rotation; substantially as described.

3. In an adding-machine, the combination with a registering-wheel, of a vibratory disk for driving the same, said disk being provided with teeth, a printing mechanism in mesh with the teeth on said disk, key-bars operatively connected to said disk at varying distances from its axis of movement, and springs for holding said key-bars normally elevated; substantially as described.

4. In an adding-machine, the combination with a registering-wheel, of a vibratory disk for driving the same, said disk being provided with teeth, a printing mechanism in mesh with the teeth on said disk, key-bars operatively connected to said disk, at varying distances from its axis of movement, springs for holding said key-bars normally elevated, and means for controlling the strokes of said key-bars; substantially as described.

5. In an adding-machine, the combination with a registering-disk, of a vibratory pawl-carrier for driving the same, a key-bar operatively connected to said pawl-carrier, and a shiftable controlling device movable under the key-bar for regulating its stroke; substantially as described.

6. In an adding-machine, the combination with a registering-wheel, of a pawl-carrier for driving the same, a key-bar operatively connected to the pawl-carrier, and a shiftable controlling device having stop-pins in different horizontal planes for coöperating with the key-bar to regulate its stroke; substantially as described.

7. In an adding-machine, the combination with a registering-wheel, of a pawl-carrier for driving the same, a plurality of key-bars operatively connected to the pawl-carrier, and a shiftable controlling device having stops in different horizontal planes designed to be placed in operative positions under the key-bars for controlling their stroke; substantially as described.

8. In an adding-machine, the combination with a registering-wheel, of a pawl-carrier for driving the same, a plurality of keys connected to the pawl-carrier at different distances from its axis of movement, a controlling device having stop-pins in different horizontal planes for coöperating with the key-bars to control their movement, and means for moving a stop-pin into and out of position under the key-bars; substantially as described.

9. In an adding-machine, the combination with a registering-wheel, of a pawl-carrier for driving the same, a key-bar operatively connected to the pawl-carrier, a shiftable controlling device carrying stop-pins in different horizontal planes designed to be located under the key-bar to control the stroke thereto, and means for moving said controlling device in either direction; substantially as described.

10. In an adding-machine, the combination with a registering-wheel, of a pawl-carrier for driving the same, a key-bar operatively connected to the pawl-carrier, means for adjustably limiting the stroke of said key-bar, and a shift-key for controlling the position of said means; substantially as described.

11. In an adding-machine, the combination with a registering-wheel, of a pawl-carrier for driving the same, a plurality of key-bars operatively connected to the pawl-carrier, a shiftable controlling device for regulating the stroke of the several keys whereby the pawl-carrier may be driven varying distances, and shift-keys for moving said controlling device in either direction; substantially as described.

12. In an adding-machine, the combination with registering devices, of keys for actuating the same, a shiftable controlling device for regulating the stroke of the several keys, and shift-keys for moving said controlling device in opposite directions from its normal position; substantially as described.

13. In an adding-machine, the combination with a registering mechanism, of actuating devices therefor including depressible keys, shiftable controlling devices coöperating with said keys for determining the distances of movement thereof, and means for moving the controlling devices laterally into and out of position under the actuating-keys, whereby said actuating-keys are arrested in different positions; substantially as described.

14. In an adding-machine, the combination with a registering mechanism, of actuating-keys therefor, each key having one or more numbers on its face, a shiftable controlling device designed to be moved into and out of position under said actuating-keys, and means located on each side of the actuating-keys and designed to be primarily operated to place the controlling device under the actuating-keys to arrest them in different positions; substantially as described.

15. In an adding-machine, the combination with registering mechanism, of keys for actuating the same, each key having a plurality of numbers on its face, said numbers appearing on colored backgrounds, and shift-keys identified with controlling devices for regulating the distance of movement of the main operating-keys, said shift-keys being colored corresponding to the backgrounds on the main keys; substantially as described.

16. In an adding-machine, the combination with registering mechanism, of three keys for driving the same, said keys bearing a plurality of numbers on their faces, and shiftable controlling devices for regulating the distance of movement of the respective keys, and shift-keys for actuating said controlling devices; substantially as described.

17. In an adding-machine, the combination with registering mechanism, of keys for driving the same, a shiftable controlling device carrying stop-pins, a guideway in which said device is slidingly mounted, and shift-keys having oppositely-inclined slots coöperating with lateral projections on said device, whereby upon the depression of either of said shift-keys, the device is moved according to the will of the operator; substantially as described.

18. In an adding-machine, the combination with registering mechanism, of actuating devices therefor, a shiftable controlling device, carrying movable stop-pins designed to be placed in the path of the actuating devices to regulate the distance of movement thereof, and printing mechanism operated from the actuated stop-pin; substantially as described.

19. In an adding-machine, the combination with registering mechanism, of actuating devices therefor, a shiftable block carrying movable stop-pins, a printing-frame which is actuated by the operated stop-pin, and means for depressing said printing-frame out of the path of movement of said stop-pin; substantially as described.

20. In an adding-machine, the combination with a registering-wheel, of a vibratory pawl-carrier for driving the same, means for actuating said pawl-carrier different distances, a printing-wheel operated by said pawl-carrier, and a shiftable controlling device carrying pins, which when operated, cause the printing-wheel to make a printing impression; substantially as described.

21. In an adding-machine, the combination with registering mechanism, of a vibratory pawl-carrier for driving the same, a disk 46 in mesh with said pawl-carrier, a printing-wheel driven by said disk, means for arresting the printing-wheel just previous to the completion of movement imparted thereto by the vibratory pawl-carrier, and means for causing said printing-wheel to make the printing impression; substantially as described.

22. In an adding-machine, the combination with registering devices, of a printing-wheel moved or actuated from the driving devices for the registering mechanism, said printing-wheel being yielding in one direction on its shaft, means for arresting said printing-wheel before the driving mechanism ceases its motion, and means for effecting a printing impression from said printing-wheel; substantially as described.

23. In an adding-machine, the combination with a registering mechanism and its driving devices, of a printing-wheel actuated from the driving devices, a spring connecting said printing-wheel to its shaft, whereby the shaft is capable of slight independent rotation, pins 48 on the printing-wheel, a stop-finger 49 coöperating with said pins, and means for lifting one end of the printing-wheel shaft and the printing-wheel to make a printing impression; substantially as described.

24. In an adding-machine, the combination with a registering-wheel, and its shaft, of a lever 28 pivoted in the end of the shaft, a lug 30 with which one end of said lever coöperates, a spring 29 for holding one end of the lever outwardly, a handle 31 on one end of said lever, and a projection 32 on the other end of said lever for limiting the outward thrust of the spring; substantially as described.

25. In an adding-machine, the combination with a registering-wheel, and means for driving the same, of a wheel of higher order mounted adjacent thereto, a star-wheel conjoined to said wheel of higher order, a projection mounted on the primary register-wheel for coöperating with the star-wheel, and passing the wheel of higher order, and means for throwing the star-wheel into and out of the path of movement of said projection; substantially as described.

26. In an adding-machine, the combination with item-printing devices, of a total-printing mechanism comprising flat-faced rollers designed to engage and feed the strip of paper over the total-printing wheels so as to locate the items above the total, a cam conjoined to said flat-faced rollers, a platen for making the printing impression, and means for rotating said flat-faced rollers and cam; substantially as described.

27. In an adding-machine, the combination with item registering and printing devices, of a total-printing mechanism, including printing-wheels operatively connected to the item-registering wheels, rollers having flat faces 63 and 64, and a handle for driving said rollers, whereby the peripheries engage and feed the paper to be printed upon, and cam 65 opposite flat faces 64, and a platen 66 which is actuated by the cam 65; substantially as described.

28. In an adding-machine, the combination with the item-register and its means of actuation, of a total-register, wheels of higher order actuated from the item-register, and a connection between said wheels comprising pinion 70 conjoined to the wheel of higher order which is primarily driven from the item-registering wheel, a segment 71 fixed to a rock-shaft 72, a segment 73, a pinion 74 in mesh with the segment 73 and the printing-wheel 75; substantially as described.

In testimony whereof I hereunto affix my signature, in the presence of two witnesses, this 16th day of July, 1903.

PHILIP H. THOMPSON.

Witnesses:
GEORGE BAKEWELL,
G. A. PENNINGTON.